US006636486B1

(12) United States Patent  
Magloughlin

(10) Patent No.: US 6,636,486 B1
(45) Date of Patent: Oct. 21, 2003

(54) SYSTEM, METHOD AND APPARATUS FOR MONITORING AND ANALYZING TRAFFIC DATA FROM MANUAL REPORTING SWITCHES

(75) Inventor: Kevin R. Magloughlin, Keller, TX (US)

(73) Assignee: Excelcom, Inc., Dallas, TX (US)

( * ) Notice: Subject to any disclaimer, the term of this patent is extended or adjusted under 35 U.S.C. 154(b) by 0 days.

(21) Appl. No.: 09/347,249

(22) Filed: Jul. 2, 1999

(51) Int. Cl.[7] .............................................. G01R 31/08
(52) U.S. Cl. ....................................................... 370/252
(58) Field of Search ................................. 370/254, 252, 370/253, 230, 242, 241–5, 248, 249, 250, 251, 389; 709/223, 224, 225; 345/736, 740

(56) References Cited

U.S. PATENT DOCUMENTS

| | | | |
|---|---|---|---|
| 4,456,788 A | 6/1984 | Kline et al. ............... | 179/7.1 R |
| 4,679,187 A | 7/1987 | Irvin ........................... | 370/17 |
| 4,723,270 A | 2/1988 | Okamoto et al. ........... | 379/113 |
| 5,197,127 A | 3/1993 | Waclawsky et al. ........ | 395/200 |
| 5,359,649 A | 10/1994 | Rosu et al. ................. | 379/220 |
| 5,386,414 A | 1/1995 | Chou et al. .................. | 370/60 |
| 5,450,601 A | 9/1995 | Okuda ......................... | 395/800 |
| 5,483,590 A | 1/1996 | Chiu et al. .................. | 379/269 |
| 5,488,715 A | 1/1996 | Wainwright ............ | 395/182.02 |
| 5,542,047 A | 7/1996 | Armstrong ............. | 395/200.11 |
| 5,583,792 A | 12/1996 | Li et al. ..................... | 364/514 |
| 5,623,540 A * | 4/1997 | Morrison et al. ....... | 379/112.01 |
| 5,706,436 A | 1/1998 | Lewis et al. ........... | 395/200.11 |
| 5,712,981 A | 1/1998 | McKee et al. ......... | 395/200.15 |
| 5,732,218 A | 3/1998 | Bland et al. ........... | 395/200.54 |
| 5,737,399 A | 4/1998 | Witzman et al. ........... | 379/112 |
| 5,751,964 A | 5/1998 | Ordanic et al. ........ | 395/200.54 |
| 5,796,633 A | 8/1998 | Burgess et al. ........ | 364/551.01 |
| 6,021,114 A * | 2/2000 | Shaffer et al. .............. | 370/232 |
| 6,473,407 B1 * | 10/2002 | Ditmer et al. ............... | 370/252 |

OTHER PUBLICATIONS

Stallings, SNMP, SNMPv2, SNMPv3 and RMON 1 and 2, third edition, 1996,pp: 27, 29, 165–172, 378–383.*

* cited by examiner

Primary Examiner—David Vincent  
(74) Attorney, Agent, or Firm—Haynes and Boone, LLP

(57) ABSTRACT

The present invention provides a system, method and apparatus for monitoring and analyzing traffic data from manual reporting switches. The present invention establishes a communication link between a remote computer and the switch. Thereafter, the present invention requests and receives the traffic data from the switch via the communication link. The remote computer then parses one or more data elements from the traffic data, compares the parsed data with corresponding threshold data, and performs one or more predefined functions based on the comparison of the parsed data with the corresponding threshold data.

19 Claims, 4 Drawing Sheets

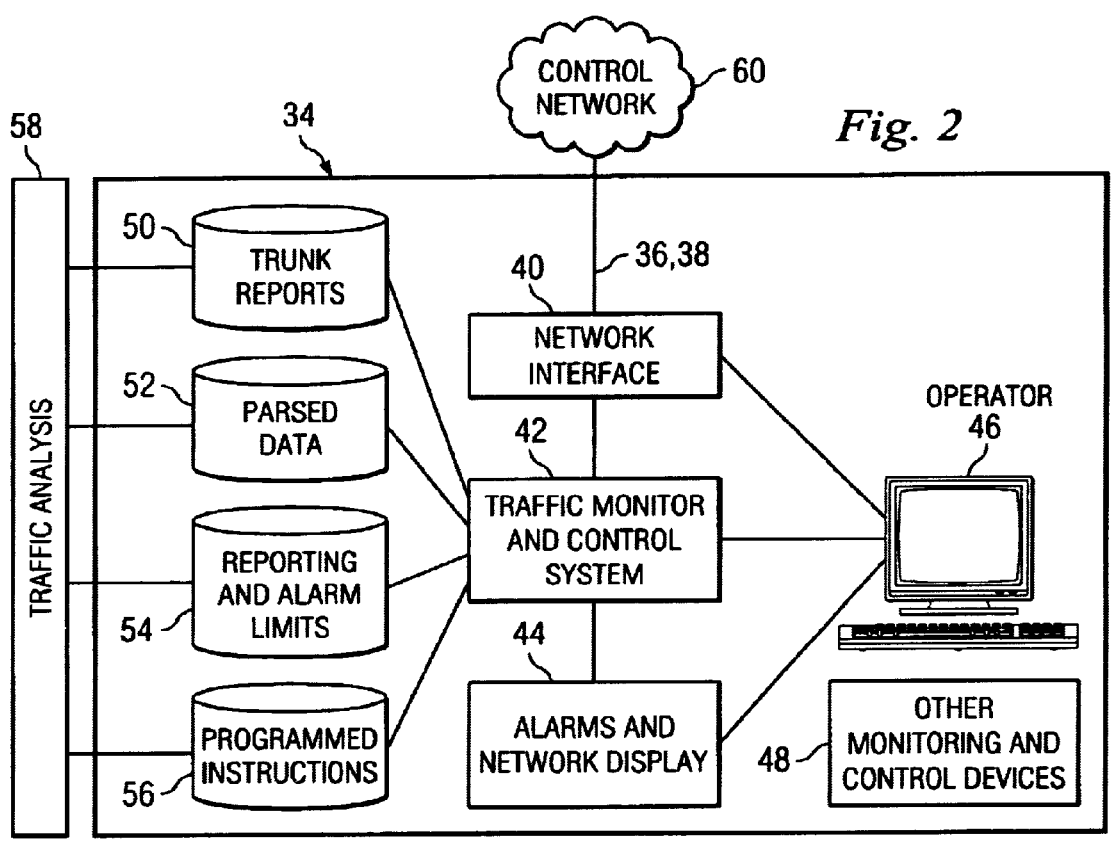
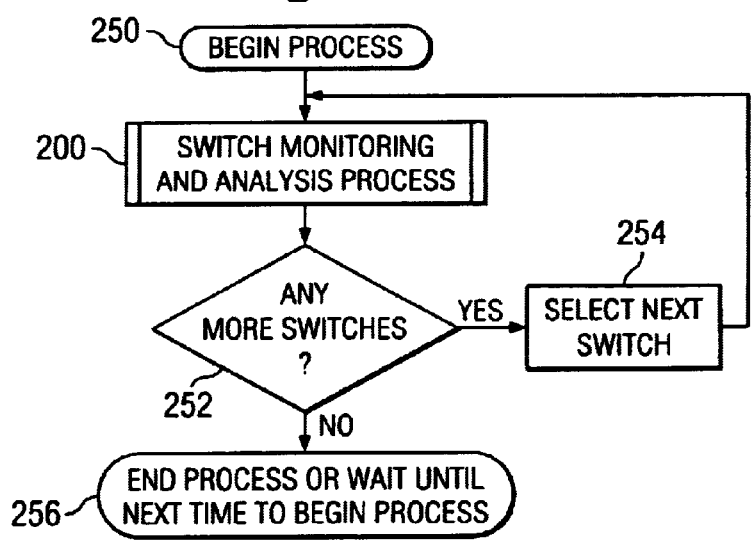

SYSTEM, METHOD AND APPARATUS FOR MONITORING AND ANALYZING TRAFFIC DATA FROM MANUAL REPORTING SWITCHES

BACKGROUND OF THE INVENTION

Without limiting the scope of the present invention, this background of the present invention is described in connection with monitoring and analyzing traffic data in a telecommunications network.

A failure to establish calls upon request from subscribers in a telecommunications network can result in significant loss of revenue to a long distance carrier. Such failures may, for example, result from errors in databases, or in network elements themselves such as switches, network control points, signal transfer points, and the like. Clearly, downtime and associated deterioration in customer service quality and lost revenues could be minimized by surveillance techniques that detect at the earliest opportunity the onset and cause of call failures.

In order to provide economical, profitable and high level service, a long distance carrier or other telecommunication network operator must identify and correct maintenance problems as soon as possible. For this reason, data concerning the traffic carried by the network (e.g., call attempts, usage, calls successfully placed in a trunk group) is typically gathered and reported for subsequent analysis. Such "traffic" data is generally collected by computer from the network at pre-determined intervals, and from various types of network elements such as voice switches, packet switches, and STPs. The traffic data may then be used by network planners, for example, to determine the appropriate trunk group or host/remote link sizes so that the network may achieve a predetermined grade of service and the optimum route selection sequences for use at different time periods for the forecasted traffic load (which is based on projection factors and statistics derived from previous gathering intervals).

The traffic information supplied to the network designer is thus currently used to efficiently allocate the physical resources that are already in the field, as well as those contemplated in planned construction. Moreover, analysis of the collected data also permits network personnel to verify whether customers are receiving an appropriate level of service from the network. Also, the traffic data enables the appropriate personnel to view and report on customer usage of particular services, switch modules, or trunks.

Real-time and historical traffic data is utilized for dynamic as well as trend analysis. Real-time traffic data originating from the various network elements flows into a data interface module and is reformatted by a data format module for input into a relational data base of a traffic data management system module. A user interface, which may be a graphical user interface, may be utilized for report generation and system management.

In addition to their use in the collection and processing of traffic data, computers may also be utilized to gather and analyze alarm reports from the network. Such computers are used by technicians to analyze and repair maintenance problems in the network. Large quantities of switch data may thus be stored and manipulated on a real-time basis to generate and display network element messages, once or repeatedly over a given time interval, which warn the monitoring technicians of service affecting problems. In this manner, switching, facility, and traffic information may be immediately displayed either graphically or textually at work station terminals located in different work-centers throughout, for example, a telephone company. Specific screens may be invoked in a windowed environment at a terminal when a given alert is received to inform the operator as to the problem or condition being reported.

Moreover, the features of telecommunication devices have advanced significantly thus helping the long distance carrier to run a more efficient and stable network. Even though there is constant pressure to upgrade older devices and expand capacity, there are many situations where this is simply not practical. As a result, much of the network may still contain older equipment which does not include the latest features. For example, the newer switches have automatic reporting features that periodically communicate traffic data to the network control center via communication links. Older switches, however, do not have automatic reporting capability. Instead, the traffic data accumulated by these older switches must be retrieved manually by the network control center by calling into the switch via communication links. Note that these older switches may only support trunk side connections, such as the DEX 600 or 600E manufactured and sold by DSC Communications, which is now owned by Alcatel USA, Inc.

SUMMARY OF THE INVENTION

The present invention provides a system, method and apparatus for monitoring and analyzing traffic data from manual reporting switches. The present invention establishes a communication link between a remote computer and the switch. Thereafter, the present invention requests and receives the traffic data from the switch via the communication link. The remote computer then parses one or more data elements from the traffic data, compares the parsed data with corresponding threshold data, and performs one or more predefined functions based on the comparison of the parsed data with the corresponding threshold data.

The apparatus and system may include a first database for storing the traffic report, a second database for storing the parsed data, a third database for storing the threshold data, and a fourth database for storing the one or more predefined functions.

BRIEF DESCRIPTION OF THE DRAWINGS

The above and further advantages of the invention may be better understood by referring to the following description in conjunction with the accompanying drawings, in which:

FIG. 2 is a block diagram of a network control center in accordance with the present invention;

FIG. 5 is a flow chart of the automated monitoring and control process in accordance with the present invention.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
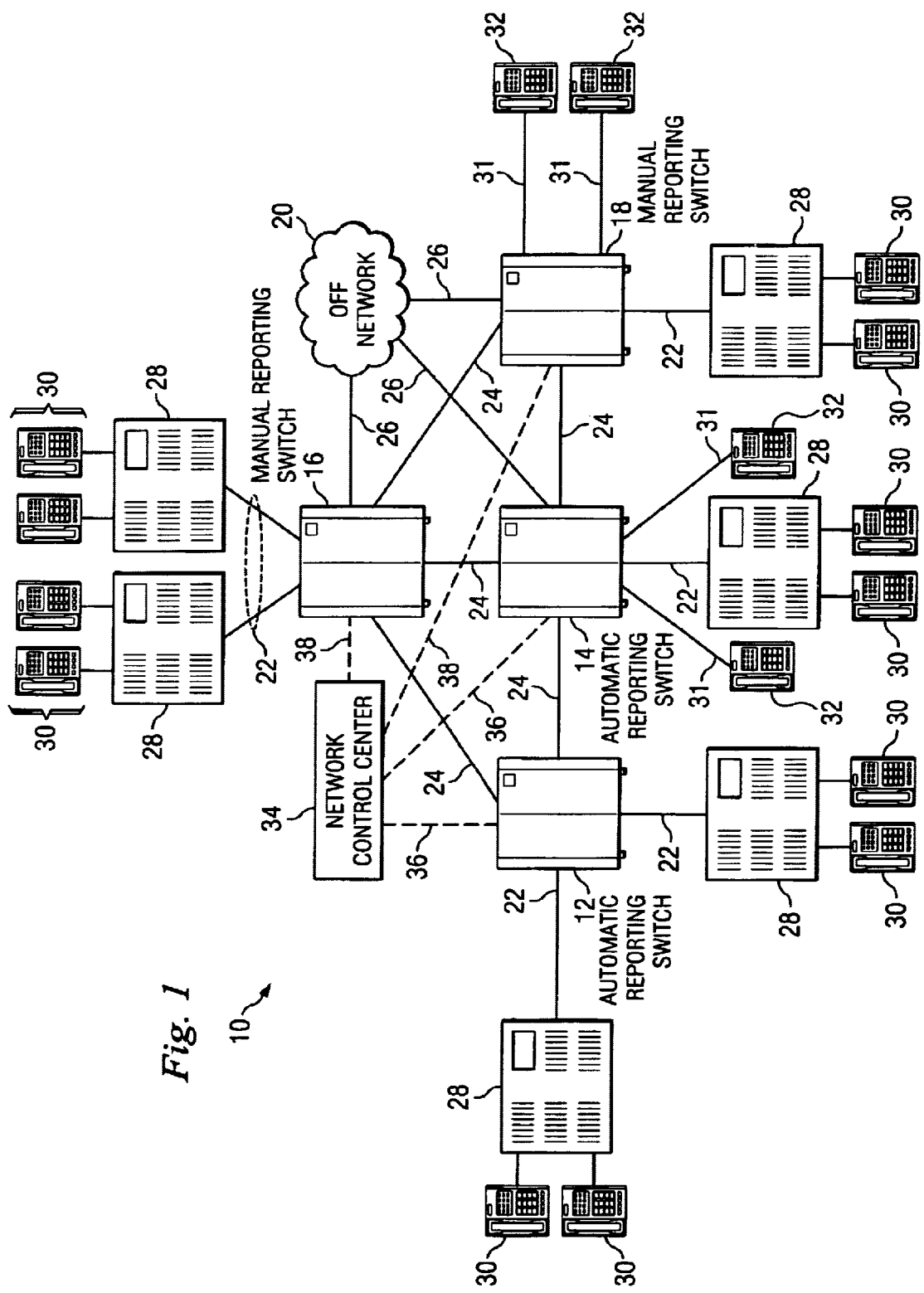
FIG. 1 is a block diagram of an illustrative telecommunications network.

Now referring to FIG. 1, an example of a telecommunication network configuration 10 will be described. Switches 12, 14, 16 and 18 are used to direct traffic through the network 10. Switches 12, 14, 16 and 18 are connected to each other and the off network 20 by trunks, which may include access lines 22, inter-machine trunks 24 and off network trunks 26. In addition, switches 12, 14, 16 and 18 are connected to private and public branch exchanges 28 by the access lines 22, and to customers 32 by telephone lines 31. As illustrated by switch 16, some types of manual switches only support trunk side connections. Customers 30 access the long distance network via the private and public branch exchanges 28; whereas customers 32 access the long distance network via switches 14 and 18.

Switches 12, 14, 16 and 18 are also connected to a network control center 34 by communication links 36 and 38. The network control center 34 monitors and controls the long distance network and provides network administration and maintenance functions. Typically, the network control center 34 is operated by a long distance carrier that owns or leases switches 12, 14, 16 and 18, inter-machine trunks 24, and communication links 36 and 38. Areas not served by the long distance network are accessed through the off network 20 via off network trunks 26.

Each switch 12, 14, 16 and 18 can have the capacity to serve thousands of stations and trunks 22, 24 and 26. The number of trunks 22, 24 and 26 served by each switch 12, 14, 16 or 18 will vary depending on the size of the trunk group and its traffic patterns. Thus, each switch 12, 14, 16, or 18 may serve a large geographical area with 1,000 trunk groups per switch or a smaller area with 100 trunk groups per switch. In addition, the trunks 22, 24 and 26 may be mixtures of satellite and terrestrial circuits.

Moreover, each switch 12, 14, 16 and 18 has network control features which allow dynamic call routing and translation, and retrieval of traffic data. These controls can typically be activated via either the network control center 34 or a designated local control terminal at each switch 12, 14, 16 and 18. Dynamic control of switches 12, 14, 16 and 18 by the network control center 34 is accomplished with a high speed data communication links 36 and 38.

Each switch 12, 14, 16 and 18 monitors its own operational characteristics and periodically generates a block of operational or traffic data. This traffic data can then be analyzed by a traffic engineer to locate anomalies and conditions which indicate current problems or could lead to future problems. Typically, the specific interval for reporting the traffic data to the network control center 34 is thirty minutes. But any suitable interval, such as 15 minutes, 30 minutes, 60 minutes, or daily, may be employed as a general matter of design choice.

In addition to traffic data, many newer switches 12 and 14 are able to detect component failures and to generate corresponding messages, hereinafter referred to as network alarm data, indicative of such failures. The network alarm data is also reported to the network control center 34. The network alarm data and traffic data are both reported to network control center 34 via data links 36.

As telecommunication systems have advanced, the ability of long distance carriers to monitor and control their networks has greatly increased. But much of the network may still contain older equipment which does not include the latest features. For example, the newer switches 12 and 14 have automatic reporting features that periodically communicate traffic data to the network control center 34 via communication links 36. Older switches 16 and 18, however, do not have automatic reporting capability. Instead, the traffic data accumulated by switches 16 and 18 must be retrieved manually by the network control center 34 by calling into the switches 16 and 18 via communication links 38. Switches 16 and 18 are older switches that may only support trunk side connections, such as the DEX 600 or 600E manufactured and sold by DSC Communications, which is now owned by Alcatel USA, Inc.

Obtaining and analyzing this traffic data is critical to the successful and profitable operation of a long distance network because in most long distance networks' transmission facility costs dominate overall network costs. Thus, obtaining the desired grade-of-service with the fewest trunks is an important goal. To achieve this goal, the overall network must first be engineered by choosing the proper number and location of network nodes and properly dimensioning the interconnecting trunk groups. Once the network is put in operation, initial traffic measurements are necessary to verify that the specified grade-of-service on each trunk group is achieved with minimum trunking. Following the initial traffic verification period, a plan of regular traffic measurements and trunk adjustments is required to accommodate changes in traffic patterns arising from network growth and other causes.

Referring now to FIG. 2, the network control center 34 is described in relation to the present invention. The network control center 34 is comprised of many components, such as a network interface 40, traffic monitor and control system 42, alarms and network display 44, operator console 46, and other monitoring and control devices 48. The traffic monitor and control system 42 has main processor and memory capable of accessing various data bases containing trunk reports 50, parsed data 52, reporting and alarm limits 54, and programmed instructions 56. These databases 50, 52, 54 and 56 are also used for traffic analysis 58. The other monitoring and control devices may include additional data storage devices, operator terminals, an alarm and exception character printer, dynamic color graphics display, remote trunk testing system and system line printer.

The traffic monitor and control system 42 and operator console 46 provide the necessary data manipulation human interface to support the central control functions. The color graphics display can provide a real-time, global view of network traffic and switch equipment status. The trunk test system is software and communications hardware that transmits control signals to the switches 12, 14, 16 and 18 (FIG. 1) via the control network 60 and communication links 36 and 38. The line printer is used to output high-volume reports. The alarm and exception printer is used to output messages of critical importance.

The typical network control center 34 provides numerous features and advantages. For example, the extensive traffic measurement features of the automatic reporting switches 12 and 14 allow automated centralized traffic data collection at the network control center 34. The network control center 34 analyzes the traffic data from all nodes in the network, and produces trunk group grade-of-service reports with system configuration recommendations to meet specified traffic objectives. In addition, traffic data is recorded for subsequent off-line analysis. These features ensure that the desired grade-of-service is achieved at the lowest transmission costs. The present invention, however, involves one aspect of the traffic monitor and control system 42: the ability to automatically access, retrieve and analyze traffic data from manual reporting switches 16 and 18 (FIG. 1). In contrast, the automatic reporting switches 12 and 14 can generate data messages to the network control center 34 according to operator defined schedules, such as by designated days, daily, hourly, etc.

Upon the detection of a fault condition or other network element malfunction, an alarm message is generated to call the attention of an operator 46 to the problem. The alarm message may, of course, take any desired format, but is typically displayed either graphically or textually on a suitable display. Alternatively, however, the alarm might take the form of an audible message, utilizing a voice synthesizer or beeper. A trouble ticket might also be generated and sent to another system.

Once traffic measurements indicative of service affecting problems have been identified, thresholds or limits for each measurement are defined and monitored by appropriate software instructions within the traffic monitor and control system 42 so that exception conditions can be detected in the incoming raw data. The traffic monitor and control system 42 validates the incoming traffic data, scans it for user-defined exception conditions, and stores it in trunk report database 50 or other suitable database so that it is available for subsequent analysis by network engineers and planners. Reference data, such as configuration information about the network elements, is typically stored in the reporting and alarm limits database 54. The incoming traffic data may be supplied to other monitoring and control devices 48.

Figure 3:
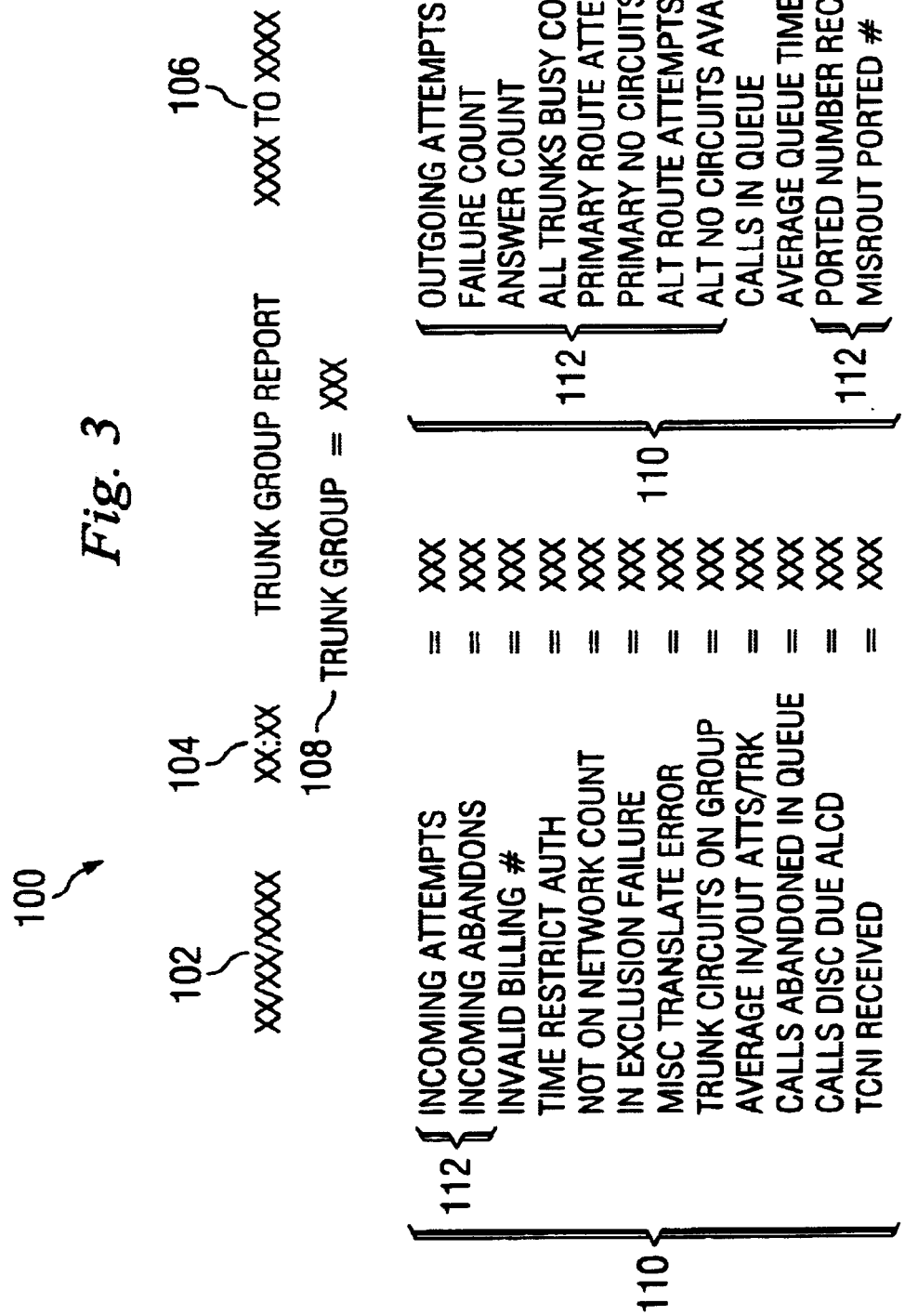
FIG. 3 is a typical trunk group report retrieved from a manual reporting switch.

Now briefly referring to FIG. 3, a typical trunk group report 100 from a manual reporting switch 16 and 18 (FIG. 1) is shown. Each trunk group report 100 provides the date 102 and time 104 the report was generated, the time period 106 in which the data was accumulated, and the trunk group 108 that the information pertains to. The trunk data 110 contained in the trunk group report 100 is incoming attempts, incoming abandons, invalid billing #, time restrict auth., not on network count, in exclusion failure, misc. translate error, trunk circuits on group, average in/out atts/trk, calls abandoned in queue, calls disc due ALCD, TCNI received, outgoing attempts, failure count, answer count, all trunks busy count, primary route attempts, primary no circuits avail., alt. route attempts, alt. no circuits avail., calls in queue, average queue time, ported number received, and misrout ported #.

Of the trunk data 110, there is key trunk data 112 that is most commonly parsed from the trunk data 110 and used to analyze the current traffic flow and status of the switch 116 and 118. This key trunk data 112 is typically incoming attempts, incoming abandons, outgoing attempts, failure count, answer count, all trunks busy count, primary route attempts, primary no circuits avail., alt. route attempts, alt. no circuits avail., ported number received, and misrout ported #.

Referring back to FIG. 2, the traffic monitor and control system 42 retrieves the trunk group reports 100 (FIG. 3) for each trunk group 22, 24 and 26 (FIG. 1) on each manual reporting switch 16 and 18 (FIG. 1) via network interface 40 and communication link 38. Each trunk group report 100 (FIG. 3) is stored in the trunk reports database 50 for a relatively short period of time due to the extremely large amount of data. The trunk group reports 100 (FIG. 3) are parsed for key information that is stored in the parsed data database 52. The parsed data is then compared against the reporting and alarm limits in database 54. A report is generated if the parsed data exceeds the reporting limits and an alarm is issued if the parsed data exceeds the alarm limits. In addition, programmed instructions stored in database 56 may be executed by the traffic monitor and control system if certain alarm limits are exceeded. Note that the reporting and alarm limits may also be based on a conditions frequency of occurrence. This would apply, for example, to intermittent hardware or software failures.

The network control center 34 alarm notification system and programmed instructions are necessary due to the extremely high volume of data that must be analyzed. Thus, the operator 46 must be made aware of critical conditions, rather than every irregularity on the network. If an alarm is generated, an alert is typically displayed to the operator 46 and the alarm is printed and recorded in an alarm log. The alarm log typically includes the date and time of occurrence, switch identification, message type, status, alarm log entry number, and space for an operator-entered free-format text area. The operator 46 is given wide-ranging ability to print, display or update alarm log entries at any time through the terminal.

Similarly, the network control center 34 provides a computerized trouble ticket log to coordinate and track general troubles. The trouble ticket format, displayed upon operator request, provides a time, date and trouble ticket number field already entered by the system. In addition, there are fields for the switch identifier, the operator's name, the site telephone number, an area for trouble descriptions and a status field (open and closed). As with the alarm log, entries may be sorted by time, date, switch, trouble ticket number or status. Also provided is a printed trouble ticket summary report. Both the alarm and trouble ticket management summary reports provide management with visibility and documentation of problems handled by the staff, and may be used as a gauge of switch and transmission performance.

Figure 4:
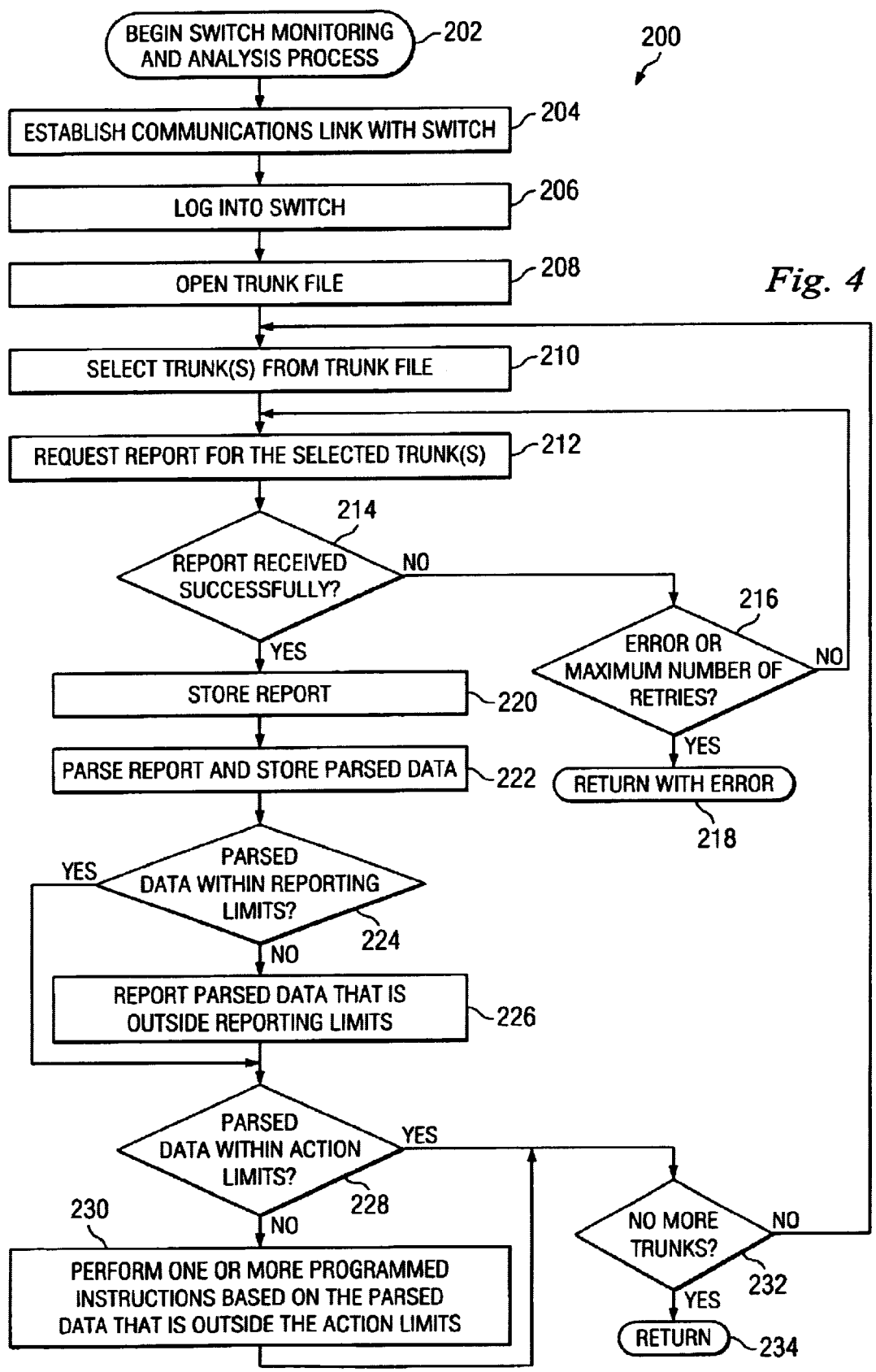
FIG. 4 is a flow chart of the monitoring and control process in accordance with the present invention.

Referring now to FIG. 4, a flow chart of the monitoring and control process in accordance with the present invention is described. The switch monitoring and analysis process 200 as it pertains to manual reporting switches 116 and 118 begins in block 202. The communications link 38 (FIG. 1) between the network control center 34 (FIG. 1) and the manual reporting switch 16 or 18 (FIG. 1) is established in block 204. Next, in block 206, the system logs into the manual reporting switch 16 or 18 (FIG. 1), which typically requires the entry of access codes and/or passwords. The trunk file for the manual reporting switch 16 or 18 (FIG. 1) is opened in block 208. The trunk file contains a listing of all trunks connected to the manual reporting switch 16 or 18 (FIG. 1). One or more trunks are selected from the trunk file in block 210. The system may select only one trunk at a time or select a group of trunks listed in the trunk file.

The system issues a report request to the manual reporting switch 16 or 18 (FIG. 1) for the selected trunk(s) in block 212. If the trunk report 100 (FIG. 3) is not successfully received, as determined in block 214, the system determines whether a fatal error or a maximum number of retries has occurred in decision block 216. If a fatal error or a maximum number of retries has occurred, the process ends or returns indicating that an error has occurred in block 218. Otherwise, the process repeats and another report request is issued to the manual reporting switch 16 or 18 (FIG. 1) for the selected trunk(s) in block 212. If, however, the trunk report 100 was successfully received, as determined in decision block 214, the trunk report 100 is stored in the trunk reports database 50 (FIG. 2) in block 220. Next, the trunk data 110 is parsed to retain the key trunk data 112 and the key trunk data 112 is stored in the parsed data database 52 (FIG. 2) in block 222.

If the key trunk data 112 is not within the reporting limits stored in the reporting and alarm limits database 54 (FIG. 2), as determined in decision block 224, the key trunk data 112 that is outside the reporting limits is reported in block 226. If, however, the key trunk data 112 is within the reporting limits stored in the reporting and alarm limits database 54 (FIG. 2), as determined in decision block 224, or the report is complete in block 226, the key trunk data 112 is compared to the action limits stored in the reporting and alarm limits database 54 (FIG. 2) in decision block 228. If the key trunk data 112 is not within the action limits stored in the reporting and alarm limits database 54 (FIG. 2), one or more programmed instructions are performed based on the key trunk data 112 that is outside the action limits in block 230. The programmed instructions are stored in the programmed instruction database 56 (FIG. 2) and may include anything from the notification of key personnel of the problem or a set of system instructions to attempt to correct or contain the problem. If, however, the key trunk data 112 is within the action limits stored in the reporting and alarm limits database 54 (FIG. 2), as determined in decision block 228, or the programmed instructions have been performed in block 230, the system determines whether there are any more trunks in the trunk file that need to have a trunk report 100 (FIG. 3) run in decision block 232. If there are more trunk reports 100 (FIG. 3) to be run, the system selects the next trunk(s) from the trunk file in block 210 and the process repeats as previously described. If, however, there are no more trunk reports 100 (FIG. 3) to be run, processing ends or returns in block 234.

Now referring to FIG. 5, a flow chart of the automated monitoring and control process in accordance with the present invention is described. The switch monitoring and analysis process 200 can be automated to run on all switches 16 and 18 (FIG. 1) within the network. The automated process begins in block 250 and then runs the previously described switch monitoring and analysis process 200. After process 200 is complete, if there are any more switches 16 and 18 (FIG. 1) within the network to be checked, as determined in decision block 252, the next switch 16 and 18 (FIG. 1) is selected in block 254 and process 200 is run for that switch. This loop continues until there are no more switches 16 and 18 (FIG. 1) to be checked, in which case the process ends in block 256. Alternatively, this process could continuously loop based on a schedule such that the process would wait in block 256 until the next time for the process to run. Moreover, the process does not have to check the same switches 16 and 18 (FIG. 1) on each cycle.

Although preferred embodiments of the invention have been described in detail, it will be understood by those skilled in the art that various modifications can be made therein without departing from the spirit and scope of the invention as set forth in the appended claims.

What is claimed is:

1. A method for use by a network control center, the method for collecting and processing traffic data from a first automatically reporting switch and a second manual reporting switch, the method comprising the steps of:

automatically receiving into a remote computer a first group of traffic data from the first switch;

establishing a communication link between a the remote computer and the second switch;

requesting a second group of traffic data from the second switch via the communication link;

receiving the second group of traffic data from the second switch via the communication link;

parsing one or more data elements from the second group of traffic data;

comparing the parsed data with corresponding threshold data; and performing one or more predefined functions based on the comparison of the parsed data with the corresponding threshold data.

2. The method as recited in claim 1, wherein the first group of traffic data is provided as a system configuration recommendation and the second group of traffic data is provided as raw data that corresponds to one or more trunk groups connected to the second switch.

3. The method as recited in claim 1, further comprising the step of selecting traffic data for one or more trunk groups connected to the second switch.

4. The method as recited in claim 3, further comprising the step of accessing a trunk file for the second switch, the trunk file identifying the one or more trunk groups connected to the second switch.

5. The method as recited in claim 1, further comprising the step of logging into the second switch.

6. The method as recited in claim 1, further comprising the step of storing the second group of traffic data at the remote computer.

7. The method as recited in claim 1, further comprising the step of storing the parsed data at the remote computer.

8. A computer program embodies on a computer readable medium for collecting and processing traffic data from a plurality of switches, a first switch being of a type that automatically reports traffic data and a second switch being of a type that does not automatically report traffic data, the computer program comprising:

a code segment for receiving traffic data automatically reported from the first switch;

a code segment for producing a first traffic report from the traffic data received from the first switch;

a code segment for establishing a communication link between a remote computer and the second switch;

a code segment for requesting traffic data from the second switch via the communication link;

a code segment for receiving the traffic data from the second switch via the communication link;

a code segment for parsing one or more data elements from the traffic data received from the second switch;

a code segment for comparing the parsed data with corresponding threshold data; and a code segment for performing one or more predefined functions based on the comparison of the parsed data with the corresponding threshold data to produce a second traffic report.

9. The computer program as recited in claim 8, wherein the traffic data corresponds to one or more trunk groups connected to the first and second switches.

10. The computer program as recited in claim 8, further comprising a code segment for selecting traffic data for one or more trunk groups connected to the second switch.

11. The computer program as recited in claim 8, further comprising a code segment for accessing a trunk file for the second switch, the trunk file identifying the one or more trunk groups connected to the second switch.

12. The computer program as recited in claim 8, further comprising:

a code segment for logging into the second switch.

13. The computer program as recited in claim 8, further comprising:

a code segment for storing the traffic reports at the remote computer.

14. The computer program as recited in claim 8, further comprising a code segment for storing the parsed data at the remote computer.

15. A centralized system for collecting and processing traffic data from a plurality of different types of switches, a first of the switches being of a type that automatically reports traffic data to the centralized system and a second of the switches being of the type that does not automatically report traffic data to the centralized system, the centralized system comprising:

an interface to establish a communication link between a computer and the switch plurality of switches;

the computer including instructions for automatically receiving traffic data from the first switch, producing a first traffic report from the traffic data received from the first switch, requesting and receiving traffic data from the second switch via the communication link, parsing one or more data elements from the traffic data received from the second switch, comparing the parsed data with corresponding threshold data, performing one or more predefined functions based on the comparison of the parsed data with the corresponding threshold data, and producing a second traffic report from the traffic data received from the second switch;

a first database for storing the traffic reports;

a second database for storing the parsed data;

a third database for storing the threshold data; and a fourth database for storing the one or more predefined functions.

16. The system recited in claim 15, wherein the traffic data corresponds to one or more trunk groups connected to the switches.

17. The system recited in claim 15, wherein the computer is further configured to select traffic data for one or more trunk groups connected to the second switch.

18. The system recited in claim 15, wherein the computer is further configured to access a trunk file for the second switch, the trunk file identifying the one or more trunk groups connected to the second switch.

19. The system recited in claim 15, wherein the computer is further configured to log into the second switch.

* * * * *